United States Patent [19]

Morine et al.

[11] Patent Number: 5,314,638
[45] Date of Patent: May 24, 1994

[54] ION EXCHANGE MATERIALS PRODUCED FROM HYDROLYZED, DEBITUMINIZED, SULFONATED PEAT

[75] Inventors: Gerald H. Morine; Steven A. Spigarelli, both of Bemidji, Minn.

[73] Assignee: Bemidji State University Foundation, Bemidji, Minn.

[21] Appl. No.: 753,386

[22] Filed: Aug. 30, 1991

[51] Int. Cl.$^5$ .............................. C01B 31/16
[52] U.S. Cl. ..................... 252/184; 252/193; 252/179; 252/180; 210/660
[58] Field of Search ............... 252/184, 179, 180, 193

[56] References Cited

U.S. PATENT DOCUMENTS

| | | | |
|---|---|---|---|
| 2,086,753 | 7/1937 | Urbain et al. | 210/2 |
| 2,191,059 | 2/1940 | Liebknacht | 252/2 |
| 2,198,393 | 4/1940 | Smit | 210/23 |
| 2,206,007 | 6/1940 | Liebknecht | 210/24 |
| 2,312,449 | 3/1943 | Shoemaker | 252/179 |
| 2,337,500 | 12/1943 | Savelli | 252/179 |
| 2,376,896 | 5/1945 | Behrman | 252/179 |
| 2,382,334 | 8/1945 | Riley | 252/179 |
| 2,393,249 | 1/1946 | Holmes | 252/193 |

Primary Examiner—Richard D. Lovering
Assistant Examiner—Joseph D. Anthony
Attorney, Agent, or Firm—Haugen and Nikolai

[57] ABSTRACT

An improved process for preparing a cation exchange material from peat selected from sphagnum or reed-sedge peat for improving the ion exchange capability of the peat. The raw peat is initially dried and ground to a particle size of less than about one millimeter, after which the particulate material is hydrolyzed in an acid solution of moderate strength for separation of soluble components. The hydrolyzed material is then refluxed in an organic solvent, such as a mixture of 2-propanol and toluene in a 1:2 volume ratio. Following removal of residual solvent, the peat is reacted with warm concentrated sulfuric acid, and thereafter ground or milled to a desirable particle size.

5 Claims, 1 Drawing Sheet

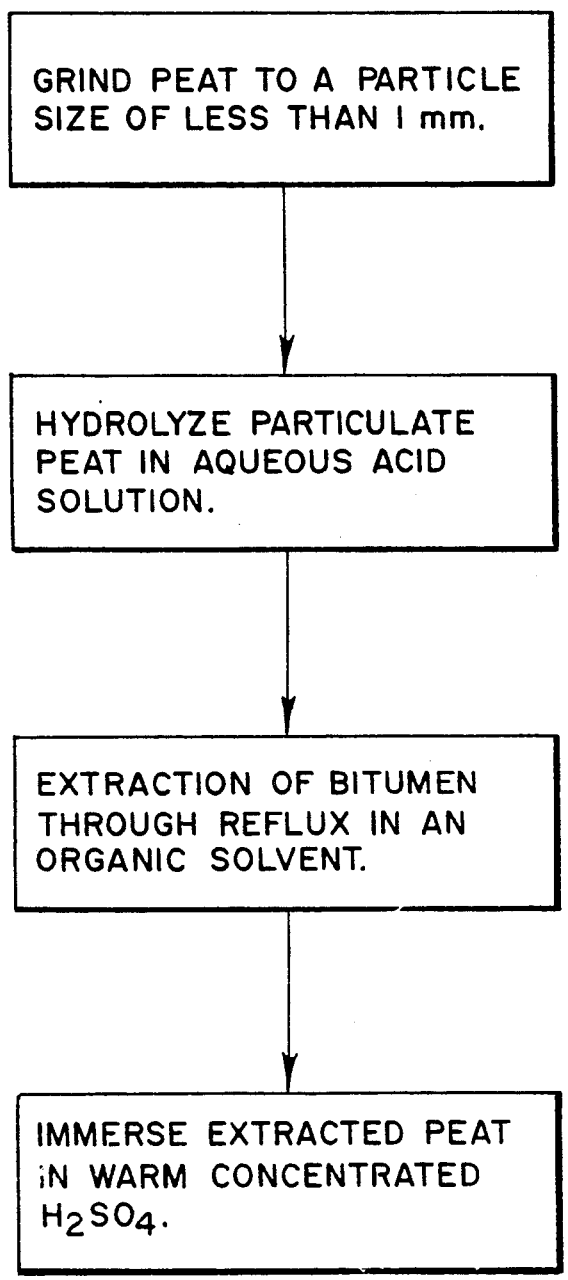

ION EXCHANGE MATERIALS PRODUCED FROM HYDROLYZED, DEBITUMINIZED, SULFONATED PEAT

BACKGROUND OF THE INVENTION

The present invention relates generally to a process for preparing cation exchange materials from peat, and more particularly to a process for improving the ion exchange capability of peat for removal of toxic and other metal ions from solution and the product produced therefrom.

Ion exchange processes are widely used for removal of certain cations from aqueous solution, including in particular, metal ions which are toxic. Certain ion exchange processes have been utilized to purify water through removal of toxic or otherwise undesirable cations by replacement in solution with less harmful or substantially innocuous ions. In other words, those ions, particularly toxic metal cations, are retained by the exchange material, while releasing generally harmless ions into the treated aqueous solution. The quality of water is accordingly improved through treatment with various ion exchange mediums.

In the past, it has been known to treat peat with sulfuric acid, and thereafter heating the treated peat. Such a process is described in U.S. Pat. No. 2,382,334, wherein certain organic carbonizable raw materials including peat have been treated with a strong sulfonating agent such as concentrated or fuming sulfuric acid. Similar processes are described in U.S. Pat. Nos. 2,191,060 and 2,191,063. While these materials have been useful for a variety of ion exchange applications, the present invention provides an improved ion exchange medium which is capable of higher capacities as well as higher preferences for certain undesirable and/or toxic metallic ions. Stated another way, the process of the present invention modifies the properties of peat so as to produce a peat-based product having improved ion exchange capacities and capabilities.

SUMMARY OF THE INVENTION

Briefly, in accordance with the present invention, an improved ion exchange material is prepared through modifying peat, with the peat preferably being derived either from sphagnum mosses or a mixture of reeds and sedges. Other forms of peat may be useful as well. The process of the present invention includes subjecting peat to a series of operations, including operations wherein the peat is hydrolyzed, debituminized, and thereafter sulfonated. In order to prepare the peat material for treatment in accordance with the process, it is air-dried and milled to form particulate materials having a diameter no greater than one millimeter. The milled particulate is then subjected to a sequence of operations, wherein it is initially hydrolyzed in warm, aqueous acid solutions in order to remove soluble components therefrom. Typically, the aqueous acidic solutions are 0.01M to 2M solutions of hydrochloric acid, although other acids such as sulfuric acid or nitric acid may be found useful.

Following the hydrolyzing operation, the particulate material is refluxed in a suitable extractor, such as an extractor having the capability of a Soxhlet extractor, and the solvent soluble bitumen is removed. Various organic solvents may be employed in the refluxing operation with essentially all organic solvents having an ability to extract bitumen. Among the wide variety of useful solvents, it is recognized that polar solvents are normally good debituminizers and will also produce the best ion exchange material. With this feature in mind, it has been found that the most effective extracting solvent is a 1:2 mixture of 2-propanol and toluene. When the operational parameters and desired characteristics of the end product are considered, alternative solvents or solvent-combinations may prove to be useful and effective as well.

Following the extraction operation, the reactant product is dried for removal of residual solvent, and immersed into hot concentrated sulfuric acid, with reaction temperatures in the acid immersion operation preferably ranging from between 100 degrees C. and 200 degrees C. Contact with the sulfuric acid is maintained for between one and four hours, after which the resultant material is rinsed with cold water and given a final rinse with 1M HCl. This material is air-dried and ground to a desired particle size for ultimate utilization and application.

The method of the present invention differs from known methods in that it includes hydrolysis with aqueous acid and extraction with organic solvent prior to its exposure to hot concentrated sulfuric acid. It has been found that the quality of the ion exchange material improves with the amount of bitumen extracted. The amount of bitumen extracted depends on the solvent used and the severity of the hydrolysis prior to debituminization.

The properties of the peat treated with the improved process have been manifested in improved ion exchange capacity and selectivity.

Therefore, it is a primary object of the present invention to provide a process for the preparation of an improved ion exchange material comprising treated peat particles.

It is a further object of the present invention to provide an improved process for treatment of peat for ultimate use as an ion exchange medium.

It is yet a further object of the present invention to provide a process for the preparation of an improved ion exchange material as well as the improved resultant product per se, with the resultant product having improved capacity and cation selectivity, and which comprises a substrate of peat with the peat preferably being derived from either sphagnum mosses or a mixture of reeds and sedges.

Other and further objects of the present invention will become apparent to those skilled in the art upon a study of the following specification, appended claims and accompanying drawing.

IN THE DRAWING

The drawing is a flow diagram for a peat treatment process to improve the ion exchange capability of peat.

DESCRIPTION OF THE PREFERRED EMBODIMENT

In accordance with the preferred embodiment of the present invention, certain experiments were undertaken in order to demonstrate the ion exchange capability of peat treated in accordance with the process of the present invention. A description of these experiments is provided in order to better comprehend and understand the various aspects of the present invention.

EXAMPLE I

A sample of reed-sedge type peat was dried and milled to a particle size of less than one millimeter. The particulate was then hydrolyzed in boiling aqueous hydrochloric acid solution (1M) and thereafter debituminized by reflux with a 1:2 (by volume) 2-propanol/toluene solution. This material was then treated with sulfuric acid, through exposure to concentrated sulfuric acid at 120 degrees C. in the proportion of 12 grams of solids with 40 ml of concentrated sulfuric acid for two hours. The acid treated material was then rinsed thoroughly in deionized water and then in 1M hydrochloric acid solution, and thereafter air-dried. The non-debituminized material was prepared by utilizing the hydrolyzation and sulfonation operations, with the solvent extraction/debituminization step being deleted.

The metal ion sorption properties of the material were determined by preparing flasks containing 0.100 gram of solid sorbent and 50 ml of 240 ppm cupric ion. The pH of each solution was adjusted with dilute NaOH until stable with the following results being obtained:

| | Final percent of cupric ion sorbed: | |
|---|---|---|
| | Percent Sorbed | |
| Sorbent pH | Non-debituminized | Debituminized |
| 4.0 | 38 | 60 |
| 5.0 | 57 | 76 |
| 6.0 | 79 | 89 |

A similar experiment was undertaken utilizing solutions initially at 50 ppm cupric ion, with the following results being obtained:

| | Final percent of cupric ion sorbed: | |
|---|---|---|
| | Percent Sorbed | |
| Sorbent pH | Non-debituminized | Debituminized |
| 3.0 | 72 | 92 |
| 4.0 | 80 | 95 |

The final percent of cupric ion sorbed was found to be substantially higher in the hydrolyzed debituminized sulfonated peat material, as compared to the same raw peat material which was merely treated with exposure to concentrated sulfuric acid.

EXAMPLE II

Copper ion sorbed on peat treated at different temperatures

A solution initially 50 ppm in cupric ion was shaken overnight with 0.0500 gram of sorbent. The samples were 0.020M in sodium nitrate and the pH was adjusted and later readjusted to 4.0. Triplicate samples were run. The peat was a reed-sedge type, hydrolyzed as in Example I, debituminized with a 1:2 (volume) 2-propanol/toluene mixture and thereafter reacted with sulfuric acid at a preselected temperature for two hours. Copper concentration of the supernatant was determined with a Corning ion selective electrode sensitive to cupric ion. Appropriate standards and blanks were used and electrode readings were done in subdued lighting to avoid false results. Sample volume: 50 mLs. Sorption experiments done at 22 degrees C. The results obtained were as follows:

| Sulfuric Acid Reaction Temperature | Percent of Copper Ion Sorbed |
|---|---|
| 100 degrees C. | 82 |
| 125 degrees C. | 85 |
| 150 degrees C. | 86 |
| 175 degrees C. | 91 |

EXAMPLE III

Nickel, chromium, lead, and manganese ion separately sorbed on debituminized, sulfonated peat and non-debituminized, sulfonated peat Samples were prepared which were 50 mL of solution initially 50 ppm in the metal ion of interest and 0.06M in NaCl, to stabilize the ionic strength during the sorption. The pH was adjusted by adding a few drops of dilute NaOH solution and monitored with a pH electrode to ± 0.01 units. A small amount, 0.0200 gram, of sorbent was added. The samples were shaken overnight and the pH readjusted if necessary. The supernatant liquid was carefully decanted and measured for metal ion content by atomic absorption spectroscopy. From these data and similar analysis of blank samples, which were lacking sorbent, the percentage of metal ion sorbed was determined. The results obtained were as follows:

| Percent Metal Ion Separately Sorbed for Hydrolyzed, Sulfonated, Non-debituminized Solid: | | | | |
|---|---|---|---|---|
| Metal Ion pH | $Ni^{+2}$ | $Cr^{+3}$ | $Pb^{+2}$ | $Mn^{+2}$ |
| 3.00 | 5 | 9 | 41 | 3.6 |
| 4.00 | 9 | 17 | 66 | — |
| 5.00 | 18 | 21 | 89 | — |

| Percent Metal Ion Separately Sorbed for Hydrolyzed, Sulfonated, Debituminized Solid: | | | | |
|---|---|---|---|---|
| Metal Ion pH | $Ni^{+2}$ | $Cr^{+3}$ | $Pb^{+2}$ | $Mn^{+2}$ |
| 3.00 | 8 | 15 | 53 | 5.0 |
| 4.00 | 16 | 22 | 82 | — |
| 5.00 | 22 | 30 | 97 | — |

Thus, is has been shown that the hydrolysis/debituminization/sulfonation procedure produces a more effective sorbent for a variety of metallic ions, as well as a range of concentrations of these ions.

EXAMPLE IV

Nickel ion (+2) sorption on hydrolyzed, debituminized, sulfonated peat debituminized with three different solvents Samples of reed-sedge and, separately, sphagnum peat were dried, milled, hydrolyzed as in Example I, and debituminized by reflux in a Soxhlet extractor. Three solvents of different polarities were used on the samples, these solvents being petroleum ether, 2-butanone, and a mixture of 2-propanol and toluene, mixed 1 to 2 by volume. Solvents were dried before use by passage through a 10 cm long column containing dried silica gel. These extracted peat were then treated with concentrated sulfuric acid, in proportions of 12 grams of peat to 40 mL of sulfuric acid, with reaction at 100 degrees C. for 2 hours. Metal ion sorption samples were then prepared and analyzed as described in Example III above. Samples each contained 0.0300 gram of sorbent. The following results were obtained:

| | Sphagnum Peat, percent metal ion sorbed: | | |
|---|---|---|---|
| | Debitumen solvent utilized | | |
| pH | 2-propanol/ toluene | 2-butanone | Petroleum ether |
| 3.00 | 38 | 23 | — |
| 4.00 | 47 | 28 | 17 |
| 5.00 | 51 | — | 24 |
| Bitumen yield (%) | 4.73 | 3.76 | 1.51 |

| | Reed-Sedge Peat, percent metal ion sorbed: | | |
|---|---|---|---|
| | Debitumen solvent utilized | | |
| pH | 2-propanol/ toluene | 2-butanone | Petroleum ether |
| 3.00 | — | 19 | 18 |
| 4.00 | — | 25 | 20 |
| 5.00 | 43 | 33 | 28 |
| Bitumen yield (%) | 3.80 | 3.22 | 1.35 |

These data show that the quality of the final material increases with the amount of bitumen recovered, and that the amount of bitumen removed increases with the polarity of the organic solvent used in the debituminization reflux. Thus, in addition to the solvent materials set forth herein, it is believed that any organic solvent that removes any bitumen will produce an improved product, and thus other solvents will be found useful.

EXAMPLE V

Cooper ion sorption in the presence of sodium and calcium ions

Samples were prepared as described in Example II above (sulfonated at 100 degrees C.) using cupric ion measured using the copper-sensitive ion selective electrode and appropriate standards. Samples were at pH=5.0, contained 0.200 gram of sorbent, and initially contained 50 mL of 200 pp cupric ion. The reed-sedge peat had been sulfuric acid reacted at 100 degrees C. The treated and debituminized material had been refluxed in a 2-propanol/toluene solution. The non-debituminized material had been hydrolyzed and sulfonated in accordance with the procedure set forth for these specific operations in Example I hereinabove. Since the ion selective electrode is sensitive to chloride ion, nitric acid was used to dissolve the copper; sodium and calcium nitrate salts were used. Some samples were prepared with no extra added salts. All other samples were 0.06 Molar (M) in sodium. Some samples also have various amounts of calcium nitrate added such as between 0.003M and 0.020M. Appropriate blanks were prepared to show that no interferences with the electrode were present. The following results were obtained:

| Copper ion percentage sorbed at equilibrium: | | |
|---|---|---|
| Ions Added | Non-debituminized | Debituminized |
| None | 99.0 | 99.7 |
| Sodium (0.060 M) | 98.3 | 99.3 |
| Calcium (0.003 M) | 94.8 | 98.3 |

| Copper ion percentage sorbed at equilibrium: | | |
|---|---|---|
| Ions Added | Non-debituminized | Debituminized |
| Calcium (0.010 M) | 86.8 | 96.1 |
| Calcium (0.020 M) | 80.8 | 92.8 |

These data show that the hydrolyzed-debituminized-sulfonated materials are strong sorbers of cupric ion even in the presence of substantial amounts of sodium and calcium ions. Further, the hydrolyzed debituminized material has been found superior in the sorption of copper ions in the presence of various innocuous cations, such as sodium and calcium. This is particularly apparent when compared to the nonbituminized material.

EXAMPLE VI

Lead ion sorption in the presence of large amounts of nickel ion

Samples were prepared as described in Example IV above, except that finer particles (smaller than 100 microns) were used. The solutions initially contained 40 ppm of $Ni^{+2}$ and 10 ppm of $Pb^{+2}$. The following results were obtained:

| Percent metal ions sorbed onto non-debituminized sorbent: | | |
|---|---|---|
| pH | $Ni^{+2}$ | $Pb^{+2}$ |
| 3.00 | 12 | 58 |
| 4.00 | 21 | 80 |
| 5.00 | 33 | 99 |

| Percent metal ions sorbed onto debituminized sorbent: | | |
|---|---|---|
| pH | $Ni^{+2}$ | $Pb^{+2}$ |
| 3.00 | 11 | 68 |
| 4.00 | 25 | 92 |
| 5.00 | 41 | 99 |

These data show that with the debituminized material, both the nickel and lead ions are more strongly sorbed. The increase in the effectiveness of sorption is greater for lead than for nickel. Thus, the debituminized material has an increased selectivity for lead ions over nickel ions when compared to the non-debituminized material.

GENERAL DISCUSSION

It can be observed from a review of the above examples that the peat treated in accordance with the process of the present invention provides a finished product which has a higher preference for undesirable and toxic metal ions, even in the presence of large amounts of less harmful positive ions, than peat treated in accordance with the procedures of the prior art. It is further observed that the process of the present invention demonstrates the increase in capacity of the treated material as well as the selectivity of the treated material for certain dissolved metallic substances.

GRINDING OPERATION

It is desired that the peat be in particulate form. This, of course, increases the surface area available, and it has been found that particle sizes of less than about one millimeter are satisfactory.

HYDROLYZING OPERATION

The hydrolyzing operation is undertaken with the particulate peat being in a moderate acidic aqueous solution. Preferably, an acid such as hydrochloric, nitric, or sulfuric is utilized with the solution preferably having a pH of between about 2 and 0.4 having been found to be useful. A solution of 1M HCl has been found satisfactory and useful when employed for this operation.

REFLUXING OPERATION

It has been indicated that the refluxing is undertaken with the hydrolyzed peat in an organic solvent for the purpose of reducing the bitumen content thereof. The quality of the final material increases with an increase in the bitumen removed. Thus, any solvent that removes bitumen will produce an ion-exchange material superior to that made from non-debituminized peat. From among the solvents, (1) 2-butanone, (2) petroleum ether and (3) a 1:2 by volume mixture of 2-propanol and toluene, the last named has the highest debituminization yield and also the highest toxic cation ion exchange effectiveness and is thus preferred from among these three solvents.

REACTION WITH SULFURIC ACID

The refluxed treated peat is exposed to concentrated sulfuric acid in order to complete the preparation operation. In particular, concentrated sulfuric acid heated to a temperature of between 100 degrees C. and 200 degrees C. is preferred, with exposure times of up to four hours having been found to be desirable. Other exposure times may be utilized, including shorter exposure times, with a useful product being obtained. Shortened exposure times may be undertaken with enhanced results being achieved when the temperature is correspondingly elevated within the 100–200 degrees C. range.

GENERAL COMMENTARY

While the resultant product of the various operations of the present invention provides a unique cation exchange material, it may be observed that the hydrolysis solution may find use as a plant growth stimulant, the bitumen as a commercial wax with the solid material resulting from the entire sequence of operations being a highly improved ion-exchange material.

It will be appreciated, of course, that those skilled in the art may depart from the specific features set forth in the examples hereinabove without actually departing from the spirit and scope of the present invention.

What is claimed is:

1. The method of preparing a cation exchange material from peat which includes the steps of:
   (a) passing a supply of dried peat through a treating chamber to reduce the particle size to less than about 1 mm;
   (b) hydrolyzing the particulate peat in an aqueous solution having a pH of less than about 2 to separate the soluble components therefrom;
   (c) refluxing the residual hydrolyzed peat in an organic solvent selected from the group consisting of petroleum ether, 2-butanone, 2-propanol, toluene, and mixtures of 2-propanol and toluene to extract solvent soluble bitumen therefrom, and thereafter drying the refluxed peat of residual solvent; and
   (d) thereafter reacting the solvent-free treated peat with concentrated sulfuric acid at a temperature greater than about 100 degrees C. for at least about one hour, and thereafter removing the remaining sulfuric acid.

2. The method as defined in claim 1 being particularly characterized in that the organic solvent is a highly polar organic solvent.

3. The method as defined in claim 1 being particularly characterized in that said organic solvent is a mixture of 2-propanol and toluene in a volume ratio of about 1:2.

4. The method as defined in claim 1 being particularly characterized in that the solvent-free treated peat is reacted with hot concentrated sulfuric acid at a temperature ranging from between 100 degrees C. and 200 degrees C.

5. A cation exchange material prepared by the processing steps of:
   (a) passing a supply of dried peat through a treating chamber to reduce the particle size to less than about 1 mm;
   (b) hydrolyzing the particulate peat in an aqueous solution having a pH of less than about 2 to separate the soluble components therefrom;
   (c) refluxing the residual hydrolyzed peat in an organic solvent selected from the group consisting of petroleum ether, 2-butanone, 2-propanol, toluene, and mixtures of 2-propanol and toluene to extract essentially all of the solvent bitumen therefrom, and thereafter drying the refluxed peat of residual solvent; and
   (d) thereafter reacting the solvent-free treated peat with concentrated sulfuric acid at a temperature greater than about 100 degrees C. for at least about one hour, and thereafter removing the remaining sulfuric acid.

* * * * *